United States Patent
Wang et al.

(10) Patent No.: US 11,940,645 B2
(45) Date of Patent: Mar. 26, 2024

(54) FRONT LIGHT MODULE AND FRONT LIGHT GUIDE PLATE OF HIGH-CONTRAST STRUCTURE

(71) Applicant: Darwin Precisions Corporation, Hsinchu County (TW)

(72) Inventors: Chun-Te Wang, Hsinchu County (TW); Yu-Shan Shen, Hsinchu County (TW); Yen-Lung Chen, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/942,299

(22) Filed: Sep. 12, 2022

(65) Prior Publication Data
US 2024/0045131 A1    Feb. 8, 2024

(30) Foreign Application Priority Data

Aug. 8, 2022    (TW) .................................. 111129752

(51) Int. Cl.
F21V 8/00    (2006.01)
(52) U.S. Cl.
CPC .................................. *G02B 6/0043* (2013.01)
(58) Field of Classification Search
CPC .. G02B 6/0036; G02B 6/0016; G02B 6/0018; G02B 6/0038
See application file for complete search history.

(56) References Cited

U.S. PATENT DOCUMENTS

| 6,522,373 | B1 | 2/2003 | Hira | |
|---|---|---|---|---|
| 2003/0090606 | A1 | 5/2003 | Lee | |
| 2004/0246698 | A1* | 12/2004 | Shimizu | G02B 6/0036 |
| | | | | 362/603 |
| 2016/0103266 | A1* | 4/2016 | Li | G02B 26/0833 |
| | | | | 264/1.24 |
| 2016/0313491 | A1* | 10/2016 | Li | G02B 6/0068 |
| 2016/0329020 | A1* | 11/2016 | Ma | G02B 6/0036 |
| 2018/0113244 | A1* | 4/2018 | Vasylyev | G02B 6/0046 |
| 2018/0299610 | A1* | 10/2018 | Saito | G02B 6/0036 |

(Continued)

FOREIGN PATENT DOCUMENTS

| CN | 113552747 A | 10/2021 |
|---|---|---|
| CN | 114137763 A * | 3/2022 |

(Continued)

*Primary Examiner* — Fatima N Farokhrooz
(74) *Attorney, Agent, or Firm* — WPAT, P.C

(57) ABSTRACT

A front light module includes a reflective display device, a front light guide, and a light emitting unit plate. The front light guide plate includes a micro-structure. The micro-structure has a first angle between a surface thereof close to the light emitting unit and an upper surface of the front light guide plate. The micro-structure has a second angle between a surface thereof away from the light emitting unit and the upper surface of the front light guide plate. The micro-structure has a third angle between the surface thereof close to the light emitting unit and the surface thereof away from the light emitting unit. The first angle is within a range between 30 degrees and 60 degrees, the second angle is within a range between 30 degrees and 59 degrees, and the third angle is greater than 90 degrees.

20 Claims, 10 Drawing Sheets

(56) References Cited

U.S. PATENT DOCUMENTS

2021/0033942 A1* 2/2021 Sadlik .................. G02B 6/0065
2021/0373225 A1* 12/2021 Yao ...................... G02B 6/0055

FOREIGN PATENT DOCUMENTS

| KR | 19990071627 A | * | 9/1999 |
| TW | I528087 B | | 4/2016 |
| TW | I533040 B | | 5/2016 |

* cited by examiner

R1

R1

R2

R2

R5

R5

FRONT LIGHT MODULE AND FRONT LIGHT GUIDE PLATE OF HIGH-CONTRAST STRUCTURE

CROSS-REFERENCE TO RELATED APPLICATION

This application claims priority to Taiwan Application Serial Number 111129752, filed Aug. 8, 2022, which is herein incorporated by reference in its entirety.

BACKGROUND

Field of Invention

The present disclosure relates to a front light module and a front light guide plate of high-contrast structure.

Description of Related Art

The front light guide plate is used in reflective display screen products such as tablet computers or e-books. How to propose a high-contrast structure applied to front light guide plate of reflective device that can improve contrast of the image is one of the problems that the industry is eager to solve by investing research and development resources.

SUMMARY

In view of this, one purpose of present disclosure is to provide a front light module and a front light guide plate of high-contrast structure that can solve the aforementioned problems.

In order to achieve the above objective, according to an embodiment of the present disclosure, a front light module includes a reflective display device, a front light guide plate, and a light emitting unit. The light emitting unit is configured to emit light. The front light guide plate is located over the reflective display device and includes a micro-structure. The micro-structure is recessed or convex. The micro-structure has a first angle between a surface thereof close to the light emitting unit and an upper surface of the front light guide plate. The micro-structure has a second angle between a surface thereof away from the light emitting unit and the upper surface of the front light guide plate. The micro-structure has a third angle between the surface thereof close to the light emitting unit and the surface thereof away from the light emitting unit. The first angle is in a range between 30 degrees and 60 degrees, the second angle is in a range between 30 degrees and 59 degrees, and the third angle is greater than 90 degrees.

In one or more embodiments of the present disclosure, the front light module further includes a first adhesive layer between the front light guide plate and the reflective display device.

In one or more embodiments of the present disclosure, the front light module further includes a cover layer located over the front light guide plate.

In one or more embodiments of the present disclosure, the cover layer and the reflective display device are disposed on opposite sides of the front light module.

In one or more embodiments of the present disclosure, the high-contrast structure applied to front light guide plate of reflective device further includes a second adhesive layer between the front light guide plate and the cover layer.

In one or more embodiments of the present disclosure, the second adhesive layer is rectangular and hollow in a top view.

In one or more embodiments of the present disclosure, the micro-structure has a depth and a length, and a ratio of the depth to the length is less than 0.3.

In one or more embodiments of the present disclosure, the micro-structure has a depth, a major axis length, and a minor axis length, and a ratio of the depth to the minor axis length or to the major axis length is less than 0.3.

In one or more embodiments of the present disclosure, the micro-structure is located on a side of the front light guide plate away from the reflective display device.

In order to achieve the above objective, according to an embodiment of the present disclosure, a front light module includes a reflective display device, a front light guide plate, a light emitting unit, and a cover layer. The light emitting unit is configured to emit light. The front light guide plate is located over the reflective display device and includes a micro-structure. The micro-structure is recessed or convex. The micro-structure has a first angle between a surface thereof close to the light emitting unit and an upper surface of the front light guide plate. The micro-structure has a second angle between a surface thereof away from the light emitting unit and the upper surface of the front light guide plate. The micro-structure has a third angle between the surface thereof close to the light emitting unit and the surface thereof away from the light emitting unit. The first angle is in a range between 30 degrees and 60 degrees, the second angle is in a range between 30 degrees and 59 degrees, and the third angle is greater than 90 degrees. The cover layer is located over the front light guide plate.

In one or more embodiments of the present disclosure, the cover layer and the reflective display device are disposed on opposite sides of the front light module.

In one or more embodiments of the present disclosure, the front light module further includes a first adhesive layer between the front light guide plate and the reflective display device.

In one or more embodiments of the present disclosure, the high-contrast structure applied to front light guide plate of reflective device further includes a second adhesive layer between the front light guide plate and the cover layer.

In one or more embodiments of the present disclosure, the second adhesive layer is rectangular and hollow in a top view.

In one or more embodiments of the present disclosure, the micro-structure has a depth and a length, and a ratio of the depth to the length is less than 0.3.

In one or more embodiments of the present disclosure, the micro-structure has a depth, a major axis length, and a minor axis length, and a ratio of the depth to the minor axis length or to the major axis length is less than 0.3.

In one or more embodiments of the present disclosure, the micro-structure is located on a side of the front light guide plate away from the reflective display device.

In order to achieve the above objective, according to an embodiment of the present disclosure, a front light guide plate of high-contrast structure includes a front light guide plate. The front light guide plate includes a micro-structure. The micro-structure is recessed or convex. The micro-structure has a first angle between a surface thereof close to a light emitting unit and an upper surface of the front light guide plate. The micro-structure has a second angle between a surface thereof away from the light emitting unit and the upper surface of the front light guide plate. The micro-structure has a third angle between the surface thereof close to the light emitting unit and the surface thereof away from the light emitting unit. The first angle is in a range between 30 degrees and 60 degrees, the second angle is in a range between 30 degrees and 59 degrees, and the third angle is greater than 90 degrees.

In summary, in the front light module of the present disclosure, since the upper surface of the front light guide plate is provided with a micro-structure, the light emitted by the light emitting unit can be refracted through the micro-structure in the front light guide plate, so that the ratio of the light entering the reflective display device increases, thereby enhancing the contrast of the image.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
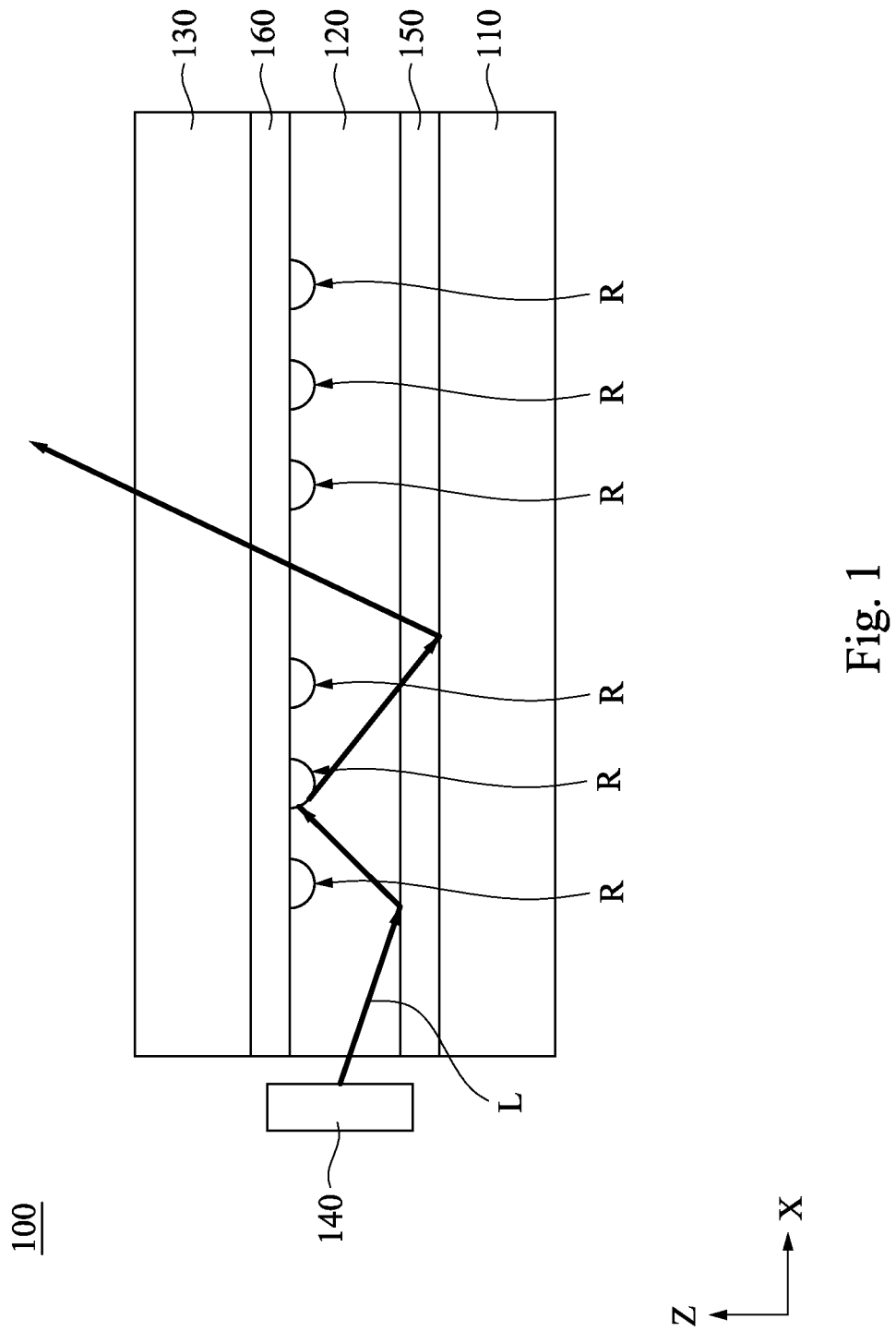
FIG. 1 is a schematic view of a front light module in accordance with an embodiment of present disclosure.

Reference will now be made in detail to the present embodiments of the disclosure, examples of which are illustrated in the accompanying drawings. Wherever possible, the same reference numbers are used in the drawings and the description to refer to the same or like parts.

In the drawings, the thickness of layers, films, panels, regions, etc., are exaggerated for clarity. Throughout the specification, the same reference numerals refer to the same elements. It will be understood that when an element such as a layer, film, region or substrate is referred to as being "on" or "connected to" another element, it can be directly on or connected to the other element, or Intermediate elements may also be present. In contrast, when an element is referred to as being "directly on" or "directly connected to" another element, there are no intervening elements present. As used herein, "connected" may refer to a physical and/or electrical connection. Furthermore, "electrically connected" or "coupled" may refer to the existence of other elements between the two elements.

It will be understood that, although the terms "first", "second", "third", etc. may be used herein to describe various elements, components, regions, layers, and/or parts. These elements, components, regions, and/or parts shall not be limited by these terms. These terms are only used to distinguish one element, component, region, layer, or part from another element, component, region, layer or part. Thus, "a first element", "component", "region", "layer", or "section" discussed below could be termed a second element, component, region, layer, or part without departing from the teachings herein.

The terminology used herein is for the purpose of describing particular embodiments only and is not limiting. As used herein, the singular forms "a," "an," and "the" are intended to include the plural forms including "at least one" unless the content clearly dictates otherwise. "Or" means "and/or". As used herein, the term "and/or" includes any and all combinations of one or more of the associated listed items. It will also be understood that, when used in this specification, the terms "comprising" and/or "including" designate the stated feature, region, integer, step, operation, presence of an element and/or part, but do not exclude the presence or addition of one or more other features, entireties of regions, steps, operations, elements, components, and/or combinations thereof.

Furthermore, relative terms such as "lower" or "bottom" and "upper" or "top" may be used herein to describe one element's relationship to another element, as shown in the figures. It should be understood that relative terms are intended to encompass different orientations of the device in addition to the orientation shown in the figures. For example, if the device in one of the figures is turned over, elements described as being on the "lower" side of other elements would then be oriented on "upper" sides of the other elements. Thus, the exemplary term "lower" may include an orientation of "lower" and "upper", depending on the particular orientation of the drawings. Similarly, if the device in one of the figures is turned over, elements described as "below" or "beneath" other elements would then be oriented "above" the other elements. Thus, the exemplary terms "below" or "under" can include an orientation of above and below.

As used herein, "about", "approximately", or "substantially" includes the stated value and the average value within an acceptable deviation of the particular value as determined by one of ordinary skill in the art, considering the discussed specific amount of measurement and measurement-related error (i.e., the limitations of the measurement system). For example, "about" can mean within one or more standard deviations of the stated value, or within ±30%, ±20%, ±10%, ±5%. Furthermore, as used herein, "about", "approximately" or "substantially" may be used to select a more acceptable range of deviation or standard deviation depending on optical properties, etching properties or other properties, and not one standard deviation may apply to all properties.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be construed as having meanings consistent with their meanings in the context of the related art and the present disclosure, and are not to be construed as idealized or excessively formal meaning, unless expressly defined as such herein.

The structure and function of each element included in a front light module 100 of this embodiment and the connection relationship between the elements will be described in detail below.

Reference is made to FIG. 1. FIG. 1 is a schematic view of a front light module 100 according to an embodiment of the present disclosure. In this embodiment, the front light module 100 includes a reflective display device 110, a front light guide plate 120, a cover layer 130, and a light emitting unit 140. The front light guide plate 120 is located over the reflective display device 110. In this embodiment, the front light guide plate 120 includes a plurality of micro-structures R. As shown in FIG. 1, a micro-structure R is disposed on a side of the front light guide plate 120 away from the reflective display device 110. In this embodiment, the cover layer 130 is located over the front light guide plate 120. In other words, as shown in FIG. 1, the cover layer 130 and the reflective display device 110 are disposed on opposite sides of the front light module 100. In some embodiments, the front light module 100 further includes a first adhesive layer 150 and a second adhesive layer 160. The first adhesive layer 150 is disposed between the reflective display device 110 and the front light guide plate 120 and is configured to adhere the front light guide plate 120 to the reflective display device 110. The second adhesive layer 160 is disposed between the front light guide plate 120 and the cover layer 130 and is configured to adhere the cover layer 130 to the front light guide plate 120. In some embodiments, the micro-structure R is recessed from a surface of the front light guide plate 120, so that a space is formed between a recessed inner surface of the micro-structure R and the second adhesive layer 160. In this embodiment, the light emitting unit 140 is adjacent to the front light guide plate 120 and is configured to emit light L. As shown in FIG. 1, after entering the front light guide plate 120, the light L emitted by the light emitting unit 140 can exit the front light module 100 by the reflection of the first adhesive layer 150, the refraction of the micro-structure R, and the reflection of the reflective display device 110. A more detailed structure of the front light module 100 will be described below.

Figure 2A:
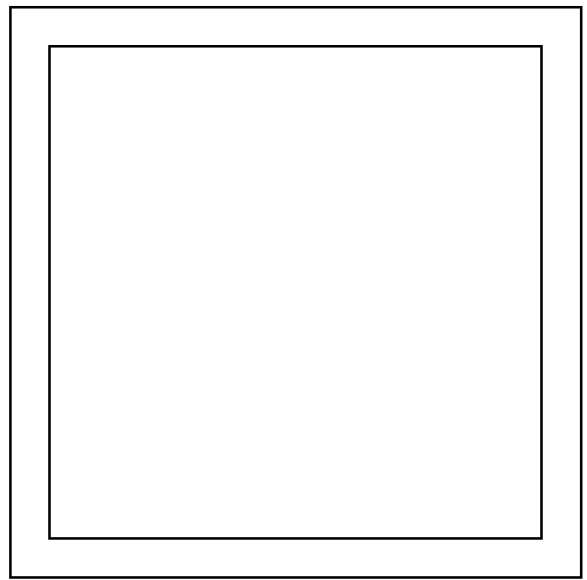
FIG. 2A is a schematic view of a second adhesive layer in accordance with an embodiment of present disclosure.
Figure 2A:
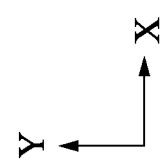

Reference is made to FIG. 2A. FIG. 2A is a top view of a second adhesive layer 160A according to an embodiment of the present disclosure. In the present disclosure, the second adhesive layer 160 includes an embodiment of the second adhesive layer 160A. In this embodiment, as shown in FIG. 2A, the second adhesive layer 160A is rectangular in a top view. In other words, the second adhesive layer 160A is to adhere the cover layer 130 to the front light guide plate 120 by means of a whole-surface lamination (i.e., full lamination).

Figure 2B:
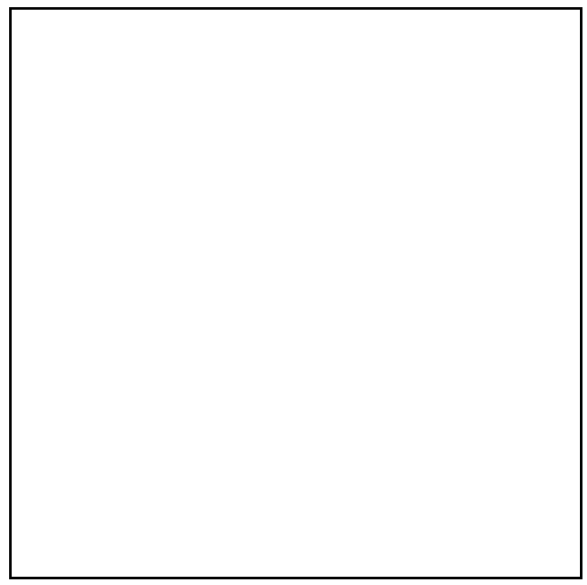
FIG. 2B is a schematic view of a second adhesive layer in accordance with an embodiment of present disclosure.
Figure 2B:
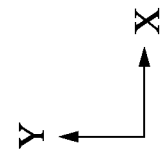

Reference is made to FIG. 2B. FIG. 2B is a top view of a second adhesive layer 160B according to an embodiment of the present disclosure. In the present disclosure, the second adhesive layer 160 includes an embodiment of the second adhesive layer 160B. In this embodiment, as shown in FIG. 2B, the second adhesive layer 160B is rectangular and hollow in a top view. In other words, the second adhesive layer 160B is to adhere the cover layer 130 to the front light guide plate 120 by means of a frame sticking (i.e., edge lamination).

In some embodiments, the first adhesive layer 150 is to adhere the front light guide plate 120 to the reflective display device 110 by means of a whole-surface lamination.

Figure 3:
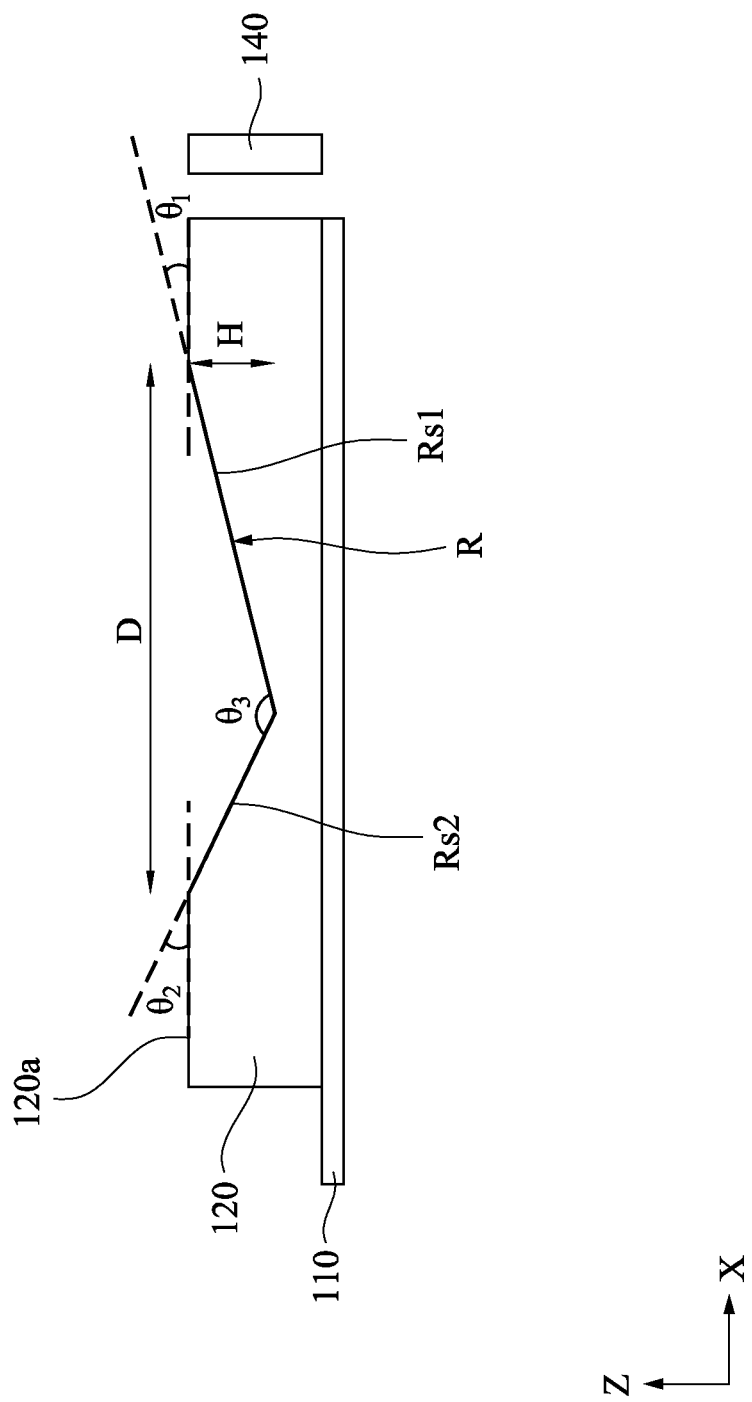
FIG. 3 is a partial schematic view of the front light module in accordance with an embodiment of present disclosure.

Reference is made to FIG. 3. FIG. 3 is a partial schematic view of the front light module 100 according to an embodiment of the present disclosure. For simplicity, the cover layer 130, the first adhesive layer 150, and the second adhesive layer 160 are not shown in FIG. 3. As shown in FIG. 3, the micro-structure R is located on an upper surface 120a of the front light guide plate 120, and the micro-structure R is recessed relative to the upper surface 120a. As shown in FIG. 3, the micro-structure R has a surface Rs1 and a surface Rs2. The surface Rs1 is located on a side of the micro-structure R close to the light emitting unit 140. The surface Rs2 is located on a side of the micro-structure R away from the light emitting unit 140. As shown in FIG. 3, a first angle $\theta_1$ which is acute is between the surface Rs1 and the upper surface 120a, a second angle $\theta_2$ which is acute is between the surface Rs2 and the upper surface 120a, and a third angle $\theta_3$ is between the surface Rs1 and the surface Rs2. In some embodiments, the first angle $\theta_1$ is in a range between 30 degrees and 60 degrees, the second angle $\theta_2$ is in a range between 30 degrees and 59 degrees, and the third angle $\delta_3$ is greater than 90 degrees.

Reference is continuously made to FIG. 3. The micro-structure R has a length D and a depth H. In some embodiments, a ratio (i.e., aspect ratio) of the depth H to the length D is less than 0.3.

Figure 4:
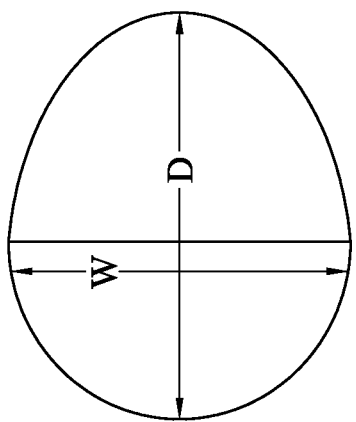
FIG. 4 is top view of micro-structures in accordance with an embodiment of present disclosure.
Figure 4:
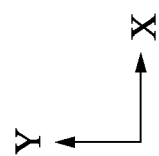

Reference is made to FIG. 4. FIG. 4 is a top view of the micro-structure R according to an embodiment of the present disclosure. In some embodiments, the micro-structures R have a length D and a width W. In some embodiments, as shown in FIG. 4, the length D may be regarded as the length of the major axis of the micro-structure R, and the width W may be regarded as the length of the minor axis of the micro-structure R. In some embodiments, a ratio of the depth H to the width W or to length D is less than 0.3.

With the aforementioned structural configuration, after the light L emitted by the light emitting unit 140 enters the front light guide plate 120, the light L is at least refracted through the micro-structure R and travels toward the reflective display device 110, and the light L exits the front light module 100 by the reflection of the reflective display device 110. Since the light L is refracted through the micro-structure R, the proportion of the light L reaching the reflective display device 110 is increased. The light L is reflected by the reflective display device 110 and then emitted, so that the reflective display device 110 can control the light extraction efficiency of the front light module 100 when switching between the bright state and the dark state, thereby achieving the effect of improving the contrast of the image.

In some embodiments, the reflective display device 110 may be a reflective display. For example, the reflective display device 110 may be a reflective liquid crystal display (RLCD) or other similar reflective displays. In some embodiments, the front light guide plate 120 may be a light guide plate or other similar light-transmitting material. In some embodiments, the front light guide plate 120 may include PMMA (polymethyl methacrylate) resin, PC resin (polycarbonate resin), or other suitable materials. In some embodiments, the cover layer 130 may be a glass substrate. In some embodiments, the cover layer 130 may include glass or other suitable transparent material. In some embodiments, the light emitting unit 140 may be an LED light source or other possible light sources. In some embodiments, the first adhesive layer 150 and the second adhesive layer 160 may be optical clear adhesive (OCA). In some embodiments, the micro-structure R may be recessed or convex. More specifically, the micro-structure R may be recessed (as shown in FIG. 1 and FIG. 3) or convex (not shown) from the upper surface 120*a*. In some embodiments, the micro-structure R is formed by a hot-pressing process, an injection process, or an ultraviolet (UV) Imprinting process.

Next, other embodiments of the micro-structure R of the present disclosure are described herein.

Figure 5B:
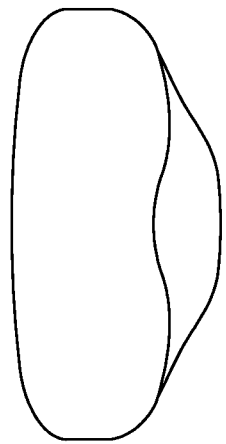
FIG. 5B is a schematic view of the micro-structures in accordance with an embodiment of present disclosure.
Figure 5B:
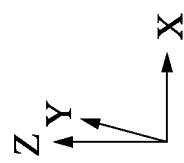
Figure 5A:
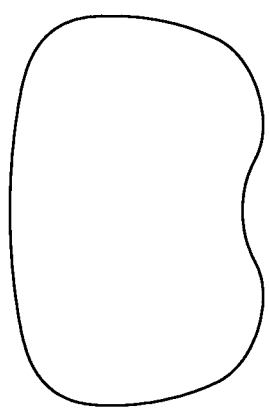
FIG. 5A is a top view of micro-structures in accordance with an embodiment of present disclosure.
Figure 5A:
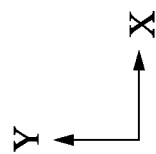

Reference is made to FIG. 5A and FIG. 5B. FIG. 5A and FIG. 5B are schematic views of different viewing angles of the micro-structure R1 according to an embodiment of the present disclosure, respectively. FIG. 5A is a top view of the micro-structure R1, and FIG. 5B is a schematic view of the micro-structure R1. In this embodiment, the micro-structure R includes an example of the micro-structure R1. For simplicity, the micro-structure R1 in FIG. 5B is shown solid, but the micro-structure R1 is actually hollowed. As shown in FIG. 5A, the micro-structure R1 has an asymmetrical and general dumbbell shape in a top view. As shown in FIG. 5B, the length and width of the micro-structure R1 taper downwards, and the bottom (i.e., the position of the third angle $\theta_3$) of the micro-structure R1 is rounded.

Next, other embodiments of the micro-structure R of the present disclosure are described herein.

Figure 6B:
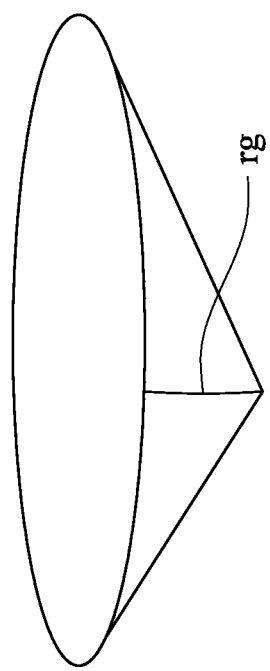
FIG. 6B is a schematic view of the micro-structures in accordance with an embodiment of present disclosure.
Figure 6B:
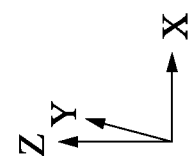
Figure 6A:
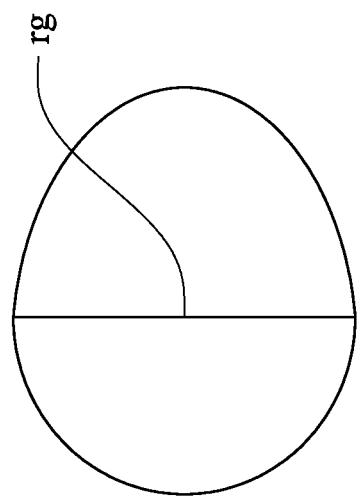
FIG. 6A is a top view of micro-structures in accordance with an embodiment of present disclosure.
Figure 6A:
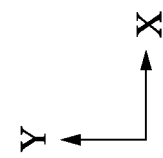

Reference is made to FIG. 6A and FIG. 6B. FIG. 6A and FIG. 6B are schematic views of different viewing angles of the micro-structure R2 according to an embodiment of the present disclosure, respectively. FIG. 6A is a top view of the micro-structure R2, and FIG. 6B is a schematic view of the micro-structure R2. In this embodiment, the micro-structure R includes an example of the micro-structure R2. For simplicity, the micro-structure R2 in FIG. 6B is shown solid, but the micro-structure R2 is actually hollowed. As shown in FIG. 6A, the micro-structure R2 has a general oval shape based on the asymmetry in the y-direction in a top view. As shown in FIGS. 6A and 6B, the micro-structure R2 has a ridge line rg. The ridge line rg is provided such that the bottom (i.e., the position of the third angle $\theta_3$) of the micro-structure R2 is sharp. As shown in FIG. 6B, the length and width of the micro-structure R2 taper downwards.

Next, other embodiments of the micro-structure R of the present disclosure are described herein.

Figure 7B:
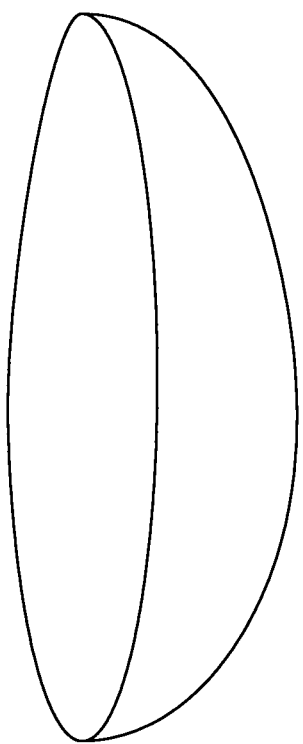
FIG. 7B is a schematic view of the micro-structures in accordance with an embodiment of present disclosure.
Figure 7A:
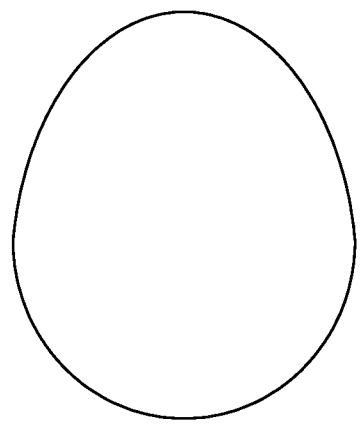
FIG. 7A is a top view of micro-structures in accordance with an embodiment of present disclosure.

Reference is made to FIG. 7A and FIG. 7B. FIG. 7A and FIG. 7B are schematic views of different viewing angles of the micro-structure R3 according to an embodiment of the present disclosure, respectively. FIG. 7A is a top view of the micro-structure R3, and FIG. 7B is a schematic view of the micro-structure R3. In this embodiment, the micro-structure R includes an example of the micro-structure R3. For simplicity, the micro-structure R3 in FIG. 7B is shown solid, but the micro-structure R3 is actually hollowed. As shown in FIG. 7A, the micro-structure R3 has a general oval shape based on the asymmetry in the y-direction in a top view. As shown in FIGS. 7A and 7B, the shape of the micro-structure R3 is substantially the same as the shape of the micro-structure R2, but the difference is that the micro-structure R3 does not have a ridge line rg. Since the micro-structure R3 does not have a ridge line rg, the bottom (i.e., the position of the third angle $\theta_3$) of the micro-structure R3 is rounded. As shown in FIG. 7B, the length and width of the micro-structure R3 taper downwards.

Next, other embodiments of the micro-structure R of the present disclosure are described herein.

Figure 8B:
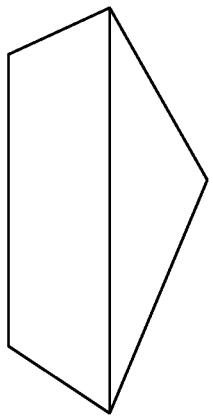
FIG. 8B is a schematic view of the micro-structures in accordance with an embodiment of present disclosure.
Figure 8B:
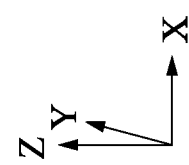
Figure 8A:
FIG. 8A is a top view of micro-structures in accordance with an embodiment of present disclosure.
Figure 8A:
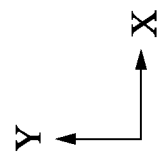

Reference is made to FIG. 8A and FIG. 8B. FIG. 8A and FIG. 8B are schematic views of different viewing angles of the micro-structure R4 according to an embodiment of the present disclosure, respectively. FIG. 8A is a top view of the micro-structure R4, and FIG. 8B is a schematic view of the micro-structure R4. In this embodiment, the micro-structure R includes an example of the micro-structure R4. For simplicity, the micro-structure R4 in FIG. 8B is shown solid, but the micro-structure R4 is actually hollowed. As shown in FIGS. 8A and 8B, the shape of the micro-structure R4 is a quadrangular pyramid. As shown in FIG. 8A, the micro-structure R4 is rectangular in top view. As shown in FIG. 8B, the bottom (i.e., the position of the third angle $\theta_3$) of the micro-structure R4 is sharp. As shown in FIG. 8B, the length and width of the micro-structure R4 taper downwards.

Next, other embodiments of the micro-structure R of the present disclosure are described herein.

Figure 9B:
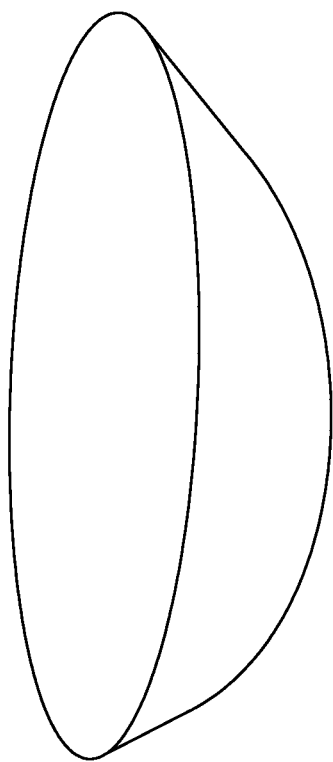
FIG. 9B is a schematic view of the micro-structures in accordance with an embodiment of present disclosure.
Figure 9A:
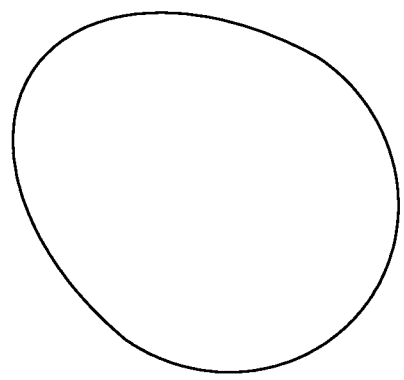
FIG. 9A is a top view of micro-structures in accordance with an embodiment of present disclosure.

Reference is made to FIG. 9A and FIG. 9B. FIG. 9A and FIG. 9B are schematic views of different viewing angles of the micro-structure R5 according to an embodiment of the present disclosure, respectively. FIG. 9A is a top view of the micro-structure R5, and FIG. 9B is a schematic view of the micro-structure R5. In this embodiment, the micro-structure R includes an example of the micro-structure R5. For simplicity, the micro-structure R5 in FIG. 9B is shown solid, but the micro-structure R5 is actually hollowed. As shown in FIG. 9A, the micro-structure R5 has an asymmetrically general oval shape in a top view. As shown in FIG. 9A and FIG. 9B, the shape of the micro-structure R5 is substantially the same as that of the micro-structure R3, but the difference is that the micro-structure R5 is rotated relative to the micro-structure R3 with the z-direction as the rotation axis by an angle. The bottom (i.e., the location of the third angle $\theta_3$) of the micro-structure R5 is rounded. As shown in FIG. 9B, the length and width of the micro-structure R5 taper downwards.

Several embodiments of the micro-structures R such as the micro-structure R1, the micro-structure R2, the micro-structure R3, the micro-structure R4, and the micro-structure R5 have been described above. In the present embodiment, the micro-structure R1, the micro-structure R2, the micro-structure R3, the micro-structure R4, and the micro-structure R5 are all located on the upper surface 120*a* of the front light guide plate 120, and simultaneously satisfy the criteria that "the first angle $\theta_1$ is in a range between 30 degrees and 60 degrees, the second angle $\theta_2$ is in the range between 30 degrees and 59 degrees, and the third angle $\theta_3$ is greater than 90 degrees".

With the aforementioned structural configuration, after the light L emitted by the light emitting unit 140 enters the front light guide plate 120, the light L is refracted by at least the micro-structures R1-R5 and travels toward the reflective display device 110, and the light L exits the front light module 100 by the reflection of the reflective display device 110. Since the light L is refracted through the micro-structures R1-R5, the proportion of the light L reaching the reflective display device 110 is increased. The light L is reflected by the reflective display device 110 and then emitted, so that the reflective display device 110 can control the light extraction efficiency of the front light module 100 when switching between the bright state and the dark state, thereby achieving the effect of improving the contrast of the image. For example, the front light guide plate 120 provided with the micro-structures R1-R5 can increase the contrast ratio (CR) of the image to 11.

In some embodiments, the micro-structures R1, R2, R3, R4, and R5 are formed by a hot-pressing process, an injection process or a UV Imprinting process.

Figure 10:
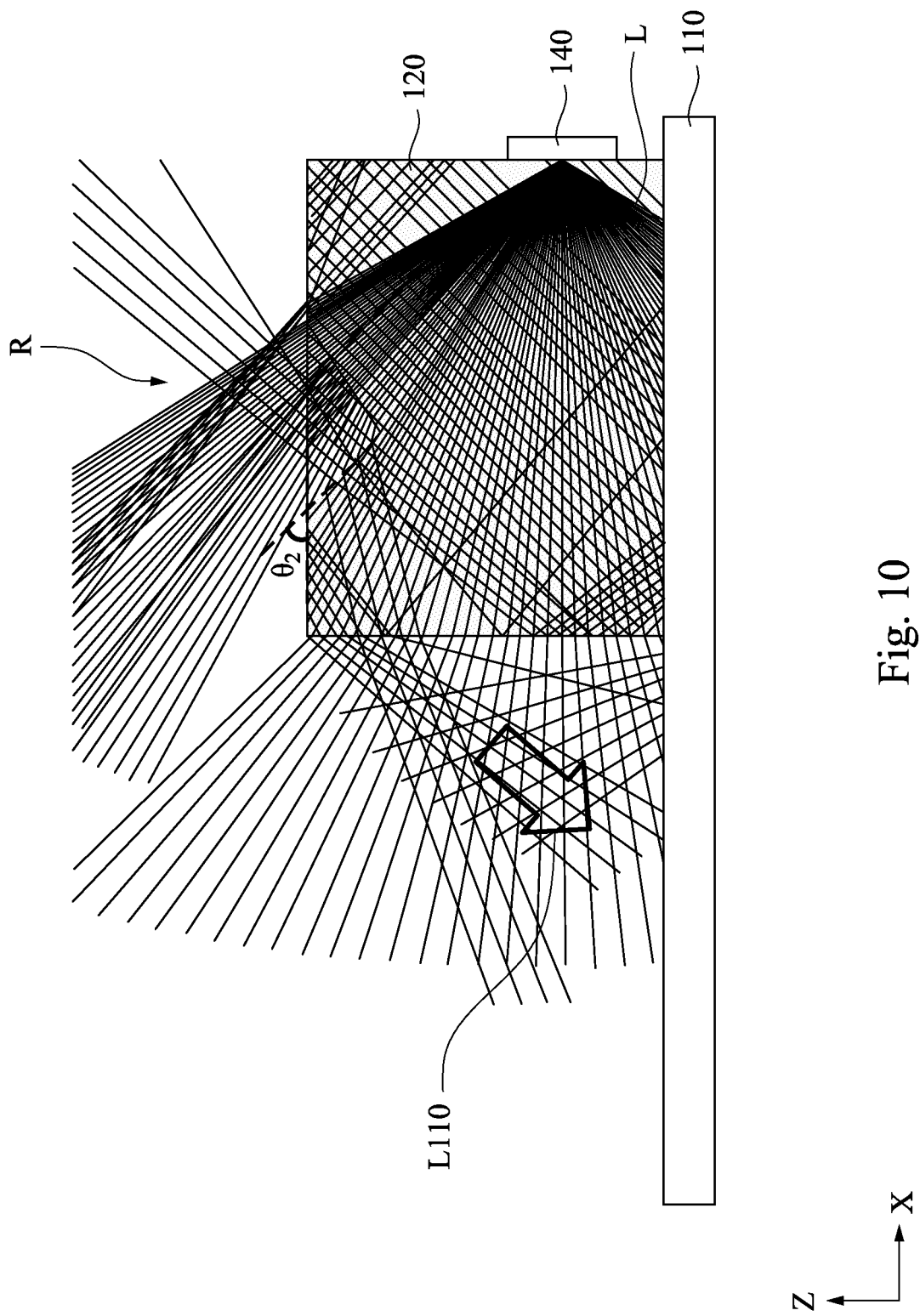
FIG. 10 is a schematic view of light through the micro-structures and scattered into a reflective display device in accordance with an embodiment of present disclosure.

Reference is made to FIG. 10. FIG. 10 is a schematic view of the light L refracted through the micro-structure R and entering the reflective display device 110 according to an embodiment of the present disclosure. FIG. 10 more clearly illustrates how the light L enters the reflective display device 110 through the micro-structures R on the front light guide plate 120. As shown in FIG. 10, the light emitting unit 140 emits the light L, wherein the light L is a radial beam. After the light L enters the front light guide plate 120, a part of the light L is refracted after passing through the micro-structure R, and enters the front light guide plate 120 again. Next, as shown in FIG. 10, the above-mentioned light L passing through the micro-structure R travels toward the reflective display device 110, and the said light L toward the reflective display device 110 are depicted as light L110 (as indicated by a hollow arrow). As shown in FIG. 10, the second angle $\theta_2$ of the micro-structure R is in the range between 30 degrees and 59 degrees, which makes the part of the light L (i.e., the light L110) emitted by the light emitting unit 140 indeed enters the reflective display device 110. The higher the ratio of the light L110 to the light L, the higher the light extraction efficiency of the front light module 100 when the reflective display device 110 switches between the bright state and the dark state, thereby improving the contrast of the image.

From the above detailed description of the specific embodiments of the present disclosure, it can be clearly seen that in the front light module of the present disclosure, since the upper surface of the front light guide plate is provided with a micro-structure, the light emitted by the light emitting unit can be refracted through the micro-structure in the front light guide plate, so that the ratio of the light entering the reflective display device increases, thereby enhancing the contrast of the image.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A front light module, comprising:
a reflective display device;
a light emitting unit configured to emit light; and
a front light guide plate located over the reflective display device and includes a micro-structure, and the micro-structure is recessed or convex, wherein a first angle is between a surface of the micro-structure close to the light emitting unit and an upper surface of the front light guide plate, a second angle is between a surface of the micro-structure away from the light emitting unit and the upper surface of the front light guide plate, and a third angle is between the surface of the micro-structure close to the light emitting unit and the surface of the micro-structure away from the light emitting unit, wherein the first angle is in a range between 30 degrees and 60 degrees, the second angle is in a range between 30 degrees and 59 degrees, and the third angle is greater than 90 degrees, wherein a footprint of the micro-structure on the upper surface of the front light guide plate has an asymmetrical and general dumbbell shape in a top view.

2. The front light module of claim 1, further comprising a first adhesive layer between the front light guide plate and the reflective display device.

3. The front light module of claim 1, further comprising a cover layer located over the front light guide plate.

4. The front light module of claim 1, wherein the micro-structure has a depth and a length, and a ratio of the depth to the length is less than 0.3.

5. The front light module of claim 1, wherein the micro-structure has a depth, a major axis length, and a minor axis length, and a ratio of the depth to the minor axis length or to the major axis length is less than 0.3.

6. The front light module of claim 1, wherein the micro-structure is located on a side of the front light guide plate away from the reflective display device.

7. The front light module of claim 1, wherein the micro-structure has a dimple in the top view.

8. The front light module of claim 3, wherein the cover layer and the reflective display device are disposed on opposite sides of the front light guide plate.

9. The front light module of claim 3, further comprising a second adhesive layer between the front light guide plate and the cover layer.

10. The front light module of claim 9, wherein the second adhesive layer is rectangular and hollow in a top view.

11. A front light module, comprising:
a reflective display device;
a light emitting unit configured to emit light;
a front light guide plate located over the reflective display device and includes a micro-structure, and the micro-structure is recessed or convex, wherein a first angle is between a surface of the micro-structure close to the light emitting unit and an upper surface of the front light guide plate, a second angle is between a surface of the micro-structure away from the light emitting unit and the upper surface of the front light guide plate, and a third angle is between the surface of the micro-structure close to the light emitting unit and the surface of the micro-structure away from the light emitting unit, wherein the first angle is in a range between 30 degrees and 60 degrees, the second angle is in a range between 30 degrees and 59 degrees, and the third angle is greater than 90 degrees, wherein a footprint of the micro-structure on the upper surface of the front light guide plate has an asymmetrical and general dumbbell shape in a top view; and
a cover layer located over the front light guide plate.

12. The front light module of claim 11, wherein the cover layer and the reflective display device are disposed on opposite sides of the front light guide plate.

13. The front light module of claim 11, further comprising a first adhesive layer between the front light guide plate and the reflective display device.

14. The front light module of claim 11, further comprising a second adhesive layer between the front light guide plate and the cover layer.

15. The front light module of claim 11, wherein the micro-structure has a depth and a length, and a ratio of the depth to the length is less than 0.3.

16. The front light module of claim 11, wherein the micro-structure has a depth, a major axis length, and a minor axis length, and a ratio of the depth to the minor axis length or to the major axis length is less than 0.3.

17. The front light module of claim 11, wherein the micro-structure is located on a side of the front light guide plate away from the reflective display device.

18. The front light module of claim 14, wherein the second adhesive layer is rectangular and hollow in a top view.

19. A front light guide plate of high-contrast structure, comprising:

a front light guide plate including a micro-structure, and the micro-structure is recessed or convex, wherein a first angle is between a surface of the micro-structure close to a light emitting unit and an upper surface of the front light guide plate, a second angle is between a surface of the micro-structure away from the light emitting unit and the upper surface of the front light guide plate, and a third angle is between the surface of the micro-structure close to the light emitting unit and the surface of the micro-structure away from the light emitting unit, wherein the first angle is in a range between 30 degrees and 60 degrees, the second angle is in a range between 30 degrees and 59 degrees, and the third angle is greater than 90 degrees, wherein a footprint of the micro-structure on the upper surface of the front light guide plate has an asymmetrical and general dumbbell shape in a top view.

20. The front light guide plate of claim 19, wherein the micro-structure has a dimple in the top view.

* * * * *